ns Patent [19]

Bailey et al.

[11] 3,808,395
[45] Apr. 30, 1974

[54] METHOD OF METALLURGICALLY JOINING A BERYLLIUM-BASE PART AND A COPPER-BASE PART

[75] Inventors: Cecil Bailey, Woodlyn; Oscar C. Frederick, Springfield; Ramamurat R. Maurya, Philadelphia; Joseph L. Talento, Media, all of Pa.

[73] Assignee: General Electric Company, Philadelphia, Pa.

[22] Filed: May 15, 1973

[21] Appl. No.: 360,521

[52] U.S. Cl. .................................... 219/121 EM
[51] Int. Cl. ............................................ B23k 15/00
[58] Field of Search ............... 219/121 EB, 121 EM; 250/49.5 R

[56] References Cited
UNITED STATES PATENTS
2,987,610  6/1961  Steigerwalis ................ 219/121 EM
3,440,392  4/1969  Erlandson et al. ......... 219/121 EB X Primary Examiner—J. V. Truhe
Assistant Examiner—G. R. Peterson
Attorney, Agent, or Firm—J. Wesley Haubner; William Freedman

[57] ABSTRACT

A method of making a metallurgical joint between a beryllium-base part and a copper-base part comprises joining the beryllium-base part to a silver insert by electron-beam welding and then metallurgically joining the silver insert to the copper-base part. The electron-beam welding operation is effected by directing the beam against a transverse surface of the insert in such a position that the conical fusion zone developed by the beam is located substantially entirely in the silver insert and the seam between the beryllium and silver parts is substantially tangent to the perimeter of the conical fusion zone. The weld is formed by moving the beam along a path that maintains the aforesaid substantially tangential relationship.

6 Claims, 6 Drawing Figures

PATENTED APR 30 1974  3,808,395
Fig. 1.
Fig. 2.
Fig. 3.
Fig. 4.
Fig. 5.
Fig. 6.
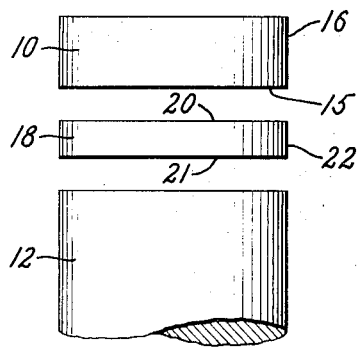
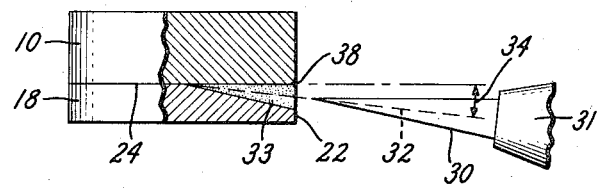
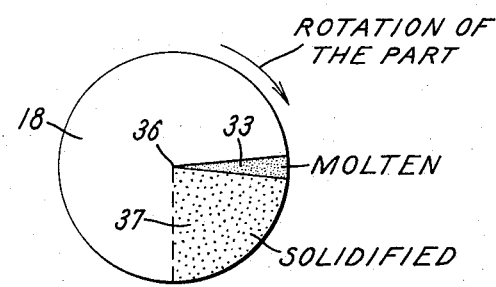
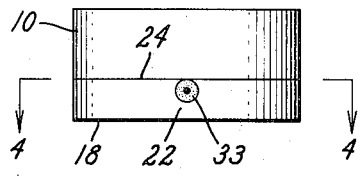
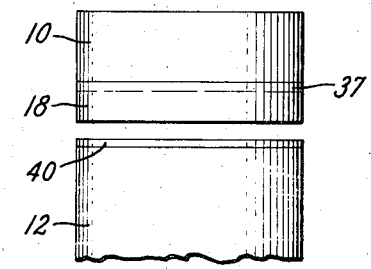
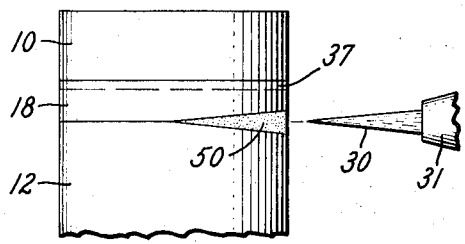

METHOD OF METALLURGICALLY JOINING A BERYLLIUM-BASE PART AND A COPPER-BASE PART

BACKGROUND

This invention relates to a method of making a high-strength, impact-resistant metallurgical joint between a beryllium-base part and another part of a dissimilar metal, such as copper, that reacts with beryllium to form brittle intermetallic compounds and, more particularly, relates to a method of this type which employs welding with a concentrated high-energy beam, such as an electron beam.

Of interest with respect to this application is copending application Ser. No. 242,609-Bailey et al., filed on Apr. 10, 1972, and assigned to the assignee of the present invention.

Prior efforts to make a strong, impact-resistant metallurgical joint between a beryllium-base part and a copper-base part have encountered serious difficulties because the beryllium and the copper of the two parts react with each other to form within the joint very brittle intermetallic compounds. The presence of these brittle intermetallic compounds renders the joint itself brittle and low in impact strength and tensile strength.

SUMMARY

An object of the present invention is to form a metallurgical joint between beryllium-base and copper-base parts which is essentially free of copper-beryllium intermetallic compounds.

In a preferred form of the invention, an insert of silver is interposed between the beryllium-base and the copper-base parts, and the beryllium-base part is joined to the silver part by welding with a concentrated high-energy beam. Locating silver instead of copper adjacent the beryllium-base material does not, however, completely eliminate the embrittlement problem because beryllium and silver can also react to form somewhat brittle intermediate phases. In addition, during the high temperature welding operation, silver can penetrate deeply into the grain structure of the beryllium-base material, and this can further weaken the joint formed upon solidification.

Thus, another object of this invention is to join the beryllium-base part and the silver insert by beam welding performed in such a way as to minimize the quantity and the detrimental effects of silver-beryllium intermediate phases and in such a way as to minimize intergranular penetration of the silver into the beryllium-base material.

Another object is to provide a method of the above type which lends itself to formation of metallurgical joints between relative massive parts, such as rods or thick discs two inches or more in diameter.

In carrying out the invention in one form, we provide a first part that has a substantially flat surface and is of a beryllium-base material, a second part that is of a copper-base material, and an insert that is of a material consisting essentially of silver. The insert has a flat surface and another surface extending transversely thereof. The first part and the insert are placed in juxtaposition with their flat surfaces engaging each other along a substantially planar seam. A high energy beam is developed that, upon impinging against the transverse surface of said insert, is capable of fusing the metallic material thereof in a substantially conical fusion zone having a base at said transverse surface and a central longitudinal axis substantially coinciding with the longitudinal axis of the beam. This beam is directed at the transverse surface of the insert with the central axis of the beam disposed at an acute angle to said seam and with its point of intersection with the transverse surface spaced from the seam by a distance such that the planar beam is substantially tangent to the perimeter of the conical fusion zone along most of the length of said fusion zone which borders said seam. Welding is effected by moving the beam relative to the insert in such a manner that said intersection point moves relative to the insert along a path substantially parallel to said seam while the beam's central axis is maintained at said acute angle relative to said seam. After the insert has thus been joined to the first part, the insert is metallurgically joined to said second part.

BRIEF DESCRIPTION OF DRAWINGS

For a better understanding of the invention, reference may be had to the following description taken in conjunction with the accompanying drawings, wherein:

FIG. 1 is a side elevational view showing the major components of our assembly prior to their being joined.

FIG. 2 is a partially sectional view showing the top two parts of FIG. 1 during an electron-beam welding operation.

FIG. 3 is a side elevational view of the structure of FIG. 2 as seen from the right hand side of FIG. 2.

FIG. 4 is a diagrammatic view of the structure of FIG. 3 taken along the line 4—4 of FIG. 3.

FIG. 5 shows an additional step in the process of making the joint.

FIG. 6 shows a modified form of additional step for making the joint.

DETAILED DESCRIPTION OF PREFERRED EMBODIMENTS

Referring now to FIG. 1, there is shown a first part 10 of a beryllium-base material that it is desired to metallurgically bond to a second part 12 of a copper-base material. In the illustrated embodiment, the first part 10 is a circular disc of essentially pure beryllium, and the second part is a cylindrical rod of essentially pure copper. Part 10 is to serve as the contact for a vaccumtype circuit interrupter and part 12 as the support rod therefor. Part 10 has a flat lower surface 15 and a second surface 16 extending transversely thereof.

In order to preclude formation of the above-discussed very brittle copper-beryllium intermetallic compounds that are usually formed when beryllium is metallurgically joined directly to copper, we interpose between the parts 10 and 12 an insert 18 of low-gas-content silver. Preferably, the silver is argon-melted silver, i. e., silver which has been melted and then solidified in low pressure argon to reduce its gas content. This insert 18 is of circular disc form and has flat upper and lower surfaces 20 and 21 and an outer surface 22 extending transversely of surfaces 20 and 21.

In preparation for the joining process soon to be described, the part 10 is cleaned by a suitable cleaning process, such as etching and/or vacuum firing. The surfaces of insert 18 are also suitably cleaned, as by etching.

Part 10 is joined to insert 18 by a beam welding process, preferably an electron-beam welding process. As a first step in this welding process, parts 10 and 18 are placed in juxtaposition with their flat surfaces 20 and 15 engaging each other along a substantially planar seam 24, as shown in FIG. 2.

The parts are then positioned in a suitable vacuum chamber (not shown), and the space around them is suitably evacuated to a pressure of about $10^{-3}$ torr. Then a concentrated high energy beam 30 is developed by means of a conventional electron beam welding gun 31 (FIG. 2). For reasons which will soon be explained, the gun is so oriented that the center line 32 of the beam is disposed at an acute angle 34 to the plane of seam 24 and intersects the transverse surface 22 at a point spaced from the plane of the seam 24. The transverse surface that the beam impinges against is that of the silver part 18.

The electron beam welding gun can be of any conventional type, such as the 150 KV welding gun sold by Hamilton-Standard Division, United Aircraft Corporation, or the 60 KV welding gun sold by Sciaky Brothers Inc. When the lower voltage Sciaky gun is used, as shown in FIG. 2, the beam is focused so that its point of focus is spaced a short distance from surface 22. Each of these guns produces a beam that, upon impinging against a surface such as 22, causes the metal therebeneath to fuse in a substantially conical fusion zone 33 that has a base at the surface 22 and a center line substantially coinciding with the center line 32 of the electron beam.

In a preferred form of the invention, we orient the beam in such a manner that the conical fusion zone 33 produced by the beam has its perimeter substantially tangent with the planar seam 24 along its length bordering the seam. This will be apparent from FIGS. 2 and 3. With the beam directed in this manner, the subassembly 10, 18 is rotated about its central axis 36 as depicted in FIG. 4, causing the conical fusion zone 33 effectively to move with respect to the seam 24. During this rotation, only the conical fusion zone is liquid. As rotation continues, new metal enters the conical fusion zone, and previously-molten metal moves therebehind, solidifying to form a substantially continuous weld 37 of progressively increasing size behind the advancing fusion zone. This rotation is continued, preferably until the cone 33 has moved through a complete 360°, thus providing a weld along the entire seam 24. It is to be understood that instead of rotating the workpiece as above described, the welding gun can alternatively be suitably moved in a circular path about the axis 36 of the workpiece 10, 18 to effect the desired movement of the fusion zone 33 relative to seam 24.

Because the periphery of the conical fusion zone is maintained substantially tangent to the seam 24, very little of the beryllium of part 10 is melted. Except at the seam 24 in the localized region where the fusion zone 33 is briefly present, the beryllium bulk of the part 10 remains relatively cool. The molten silver in the fusion zone wets the immediately adjacent beryllium, diffuses slightly into it, and forms a strong bond therewith upon solidification.

In joints made as above-described, it was observed that immediately adjacent the transverse outer surface 16 of the beryllium part, the fusion zone 33 did appear to overlap slightly into the beryllium, as shown at 38 in FIG. 2. While this overlap is a slight departure from the ideal of precise tangency along the entire length of the fusion zone, this slight overlap does not appear to produce significant degradation of the final joint. The overlap does seem to result in the presence of some small, discreet, scattered particles of beryllium in the weld zone 37 (observable by microscope under magnifications of about 250 X), but these particles seem to be sufficiently small, scattered, and discreet as not to result in significant quantities of the brittle silver-beryllium intermediate phase being present in the weld zone.

Although beryllium and silver are capable of reacting to form a somewhat brittle intermediate phase, as above mentioned, we are able to effectively minimize the quantity and detrimental effect of this intermediate phase by drastically limiting the heating of the beryllium and the time that any given portion of the beryllium is subjected to the high temperature of the fusion zone 33. This follows particularly from the fact that the fusion zone itself is of a very low volume, has only limited area contact with the beryllium at any instant, and is being steadily moved with respect to seam 24.

Another mechanism by which the beryllium can be weakened is through deep intergranular penetration of the silver into the beryllium. By limiting the heating of the beryllium and the time that the beryllium is at high temperature, as described in the immediately-preceding paragraph, we drastically limit such intergranular penetration.

Another factor that appears to contribute favorably to the quality of the joint is the turbulence developed within the molten silver of the fusion zone 33 during electron beam melting. This turbulence helps to break the tenacious beryllium oxide coating on the beryllium surface, thus significantly improving the wettability of this surface by the molten silver.

Although in a preferred form of the invention, the electron beam is oriented as above described, our invention in its broader aspects may be practiced without achieving precise tangency between the fusion zone and the seam 24. It is desirable, however, to limit as much as possible the extent to which the fusion zone extends into the beryllium, thus reducing the chances for forming brittle silver-beryllium intermediate phases and for deep intergranular penetration of the silver into the beryllium.

After the parts 10 and 18 are joined together as above described, the resulting subassembly 10, 18 is metallurgically joined to the copper rod 12. In a preferred form of the invention, the silver insert 18 is brazed to rod 12 by a suitable furnace-brazing operation. As a part of this operation, a shim 40 of a suitable brazing alloy, such as silver-copper-indium, is placed atop the rod 12, after which the subassembly 10, 18 is placed atop the shim 40, with the insert 18 contacting the shim. The temperature of the brazing furnace is then raised to about 720° C (assuming the silver-copper-indium brazing alloy is used) thereby melting the brazing shim and causing the resultant molten metal to wet the adjacent surfaces and diffuse slightly into the surfaces. Thereafter, the temperature is reduced, causing the material of the brazing shim to solidify and bond to the adjacent surfaces. Other suitable brazing alloys can be used instead of silver-copper-indium, but they should have a melting temperature substantially below the melting temperature (780° C) of the copper-silver eutectic.

In another embodiment of the invention, the joint between insert 18 and rod 12 is effected by electron beam welding utilizing the gun 31 in a conventional manner, as shown in FIG. 6. It is very desirable that the fusion zone 50 formed during this latter beam welding operation not overlap the previously described weld zone 37 between parts 10 and 18. This is the case because it is desired to prevent any of the above-described particles of beryllium in the weld zone 37 from reacting with copper in fusion zone 50, thus precluding any formation of the very brittle copper-beryllium intermetallics. To assure isolation of the two weld zones from each other, we prefer in one embodiment of our invention where the parts are 2 inches in diameter to make the silver insert at least three-sixteenth inch in thickness. As advantage of the embodiment of FIG. 5 is that we can reduce this thickness without risking any reaction of copper and beryllium.

As an indication of the high tensile and impact strengths attainable with the above described joints, tests have been made with parts joined together as above described, which tests showed tensile and impact strengths for the joint about equal to those of the beryllium itself. These test samples had a diameter of 0.5 inches in the plane of the joint.

One other advantage of our method not mentioned hereinabove is that after the beam welding step of FIGS. 2–4, no machining of the resulting subassembly 10, 18 is required as a condition precedent to joining the subassembly to the rod 12. The lower surface 21 of the insert 18 remains flat and smooth despite the beam welding step of FIGS. 2–4 and can readily be joined to the rod 12 by the methods of FIGS. 5 and 6 without any machining prior to such joining.

Although our invention is especially applicable to a method of joining a beryllium-base part to a part 12 of copper-base material, it is applicable in its broader aspects to a method wherein part 12 is of some other dissimilar material, e.g., nickel, that reacts with beryllium to form brittle intermetallic compounds. The method is carried out in essentially the same way as above described when the part 12 is of such other material.

While we have shown and described particular embodiments of our invention, it will be obvious to those skilled in the art that various changes and modifications may be made without departing from the invention in its broader aspects; and we, therefore, intend in the appended claims to cover all such changes and modifications as fall within the true spirit and scope of our invention.

We claim:

1. A method of making a high-strength, impact-resistant, metallurgical joint between a first part of beryllium-base material having a substantially flat surface and a second part of a dissimilar material that reacts with beryllium to form brittle intermetallic compounds, comprising the steps of:
   a. providing an insert of a material consisting essentially of silver, said insert having a substantially flat surface and another surface extending transversely thereof,
   b. positioning said first part and said insert in juxtaposition, with said flat surfaces engaging each other along a substantially planar seam,
   c. developing a high energy beam that, upon impinging against the transverse surface of said insert, is capable of fusing the metallic material of said insert in a substantially conical fusion zone having a base at said transverse surface and a central longitudinal axis substantially coinciding with the central axis of said beam,
   d. directing said beam at said transverse surface of said insert with the central axis of the beam intersecting said transverse surface at a point spaced from said seam by a distance such that said conical fusion zone borders said seam and is located substantially entirely in the material of said insert,
   e. forming a weld along said seam by moving said beam relative to said insert in such a manner that said intersection point moves relative to said insert along a path substantially parallel to said seam and spaced by said distance from said seam,
   f. and metallurgically joining said insert to said second part.

2. The method of claim 1 in which:
   a. the central axis of said beam is disposed at an acute angle to said seam of such a value that said seam is substantially tangent to the perimeter of said conical fusion zone along most of the length of said fusion zone that borders said seam,
   b. said central axis is maintained at said acute angle while said beam is being moved relative to said insert.

3. The method of claim 1 in which said dissimilar material is a copper-base material.

4. The method of claim 2 in which said dissimilar material is a copper-base material.

5. The method of claim 1 in which said insert is joined to said second part by a brazing operation.

6. The method of claim 1 in which:
   a. the zone melted by said beam as it moves along said path is referred to herein as a weld zone, and
   b. said insert is joined to said second part by a beam welding operation that forms a conical fusion zone that is moved within the material of said insert, said insert being sufficiently thick to prevent said latter conical fusion zone from overlapping with the weld zone formed by the beam welding operation of claim 1.

* * * * *